(12) United States Patent
Bilgen et al.

(10) Patent No.: US 12,743,902 B2
(45) Date of Patent: Sep. 22, 2026

(54) MULTI-MODAL DOCUMENT TYPE CLASSIFICATION SYSTEMS AND METHODS

(71) Applicant: Base64.ai, Inc., New York, NY (US)

(72) Inventors: Ozan Eren Bilgen, New York, NY (US); Alperen Sahin, Istanbul (TR); Mustafa Batuhan Ceylan, Balikesir (TR); Begum Yalcin, Amsterdam (NL); Can Korkut, Ankara (TR); Hasan Huseyin Kacmaz, Munich (DE); Ihsan Soydemir, Munich (DE); Bryan Contreras Herrera, New York, NY (US); Mizane Johnson-Bowman, Voorhees Township, NJ (US); Gulsah Dengiz, Bursa (TR)

(73) Assignee: Base64.ai, Inc., New York, NY (US)

( * ) Notice: Subject to any disclaimer, the term of this patent is extended or adjusted under 35 U.S.C. 154(b) by 666 days.

(21) Appl. No.: 18/307,682

(22) Filed: Apr. 26, 2023

(65) Prior Publication Data

US 2024/0362944 A1 Oct. 31, 2024

(51) Int. Cl.

| | |
|---|---|
| ***G06V 30/413*** | (2022.01) |
| ***G06V 30/18*** | (2022.01) |
| ***G06V 30/19*** | (2022.01) |
| ***G06V 30/42*** | (2022.01) |

(52) U.S. Cl.

CPC ............ *G06V 30/413* (2022.01); *G06V 30/18* (2022.01); *G06V 30/19147* (2022.01); *G06V 30/42* (2022.01)

(58) Field of Classification Search

None

See application file for complete search history.

(56) References Cited

U.S. PATENT DOCUMENTS

| | | | |
|---|---|---|---|
| 11,715,310 B1 | 8/2023 | Sammons et al. | |
| 11,755,757 B1 * | 9/2023 | Rodriguez ........... | G06K 7/1413 726/30 |
| 12,462,063 B1 * | 11/2025 | Gogel .................. | G06K 7/1417 |
| 2017/0372460 A1 | 12/2017 | Zagaynov et al. | |
| 2019/0278986 A1 | 9/2019 | Nepomniachtchi et al. | |
| 2019/0294661 A1 | 9/2019 | Sarkar | |
| 2020/0184210 A1 | 6/2020 | Malabarba | |
| 2021/0157861 A1 | 5/2021 | Katzman et al. | |
| 2021/0326630 A1 | 10/2021 | Chen et al. | |
| 2021/0334529 A1 | 10/2021 | Zakharov et al. | |
| 2022/0309813 A1 | 9/2022 | Melchy et al. | |
| 2022/0414370 A1 | 12/2022 | Pribble et al. | |

(Continued)

FOREIGN PATENT DOCUMENTS

| | | | |
|---|---|---|---|
| WO | WO-2021086837 A1 * | 5/2021 | ............ G06F 21/44 |

*Primary Examiner* — Andrew H Lam

(74) *Attorney, Agent, or Firm* — Lynch LLP; Sean Lynch

(57) ABSTRACT

Artificial intelligence (AI) systems of the inventive subject matter are directed to receiving uploaded images containing one or more document, identifying the type of documents received, and returning information contained in those documents. Upon receiving an image containing a document, the AI system: checks for barcodes, OCRs any text, detects visual features, and detects an overall document shape. The AI system can then use any information gathered during those steps to ultimately verify information contained in the document.

20 Claims, 6 Drawing Sheets

(56) References Cited

U.S. PATENT DOCUMENTS

| | | | |
|---|---|---|---|
| 2023/0090313 | A1 | 3/2023 | Mittal et al. |
| 2023/0351790 | A1 | 11/2023 | Zhu et al. |
| 2024/0220727 | A1 | 7/2024 | Yuan et al. |
| 2024/0221411 | A1 | 7/2024 | Wells et al. |
| 2024/0248896 | A1 | 7/2024 | Boskovic et al. |

* cited by examiner

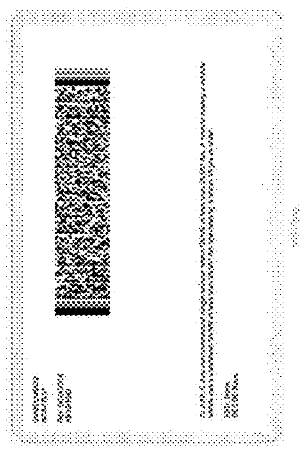
FIG. 3
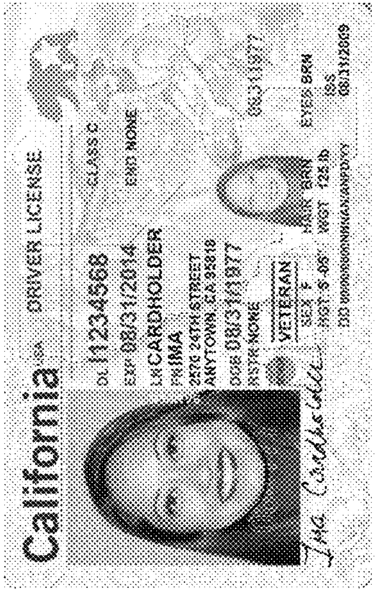
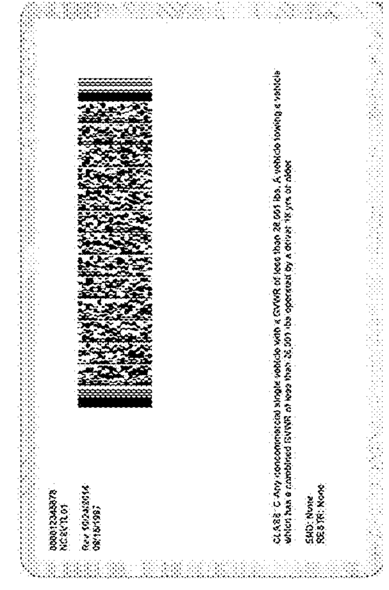
FIG. 2

Visual result | API response

| | |
|---|---|
| **Model:** | **Form (Semantic)** **Contact us to build your custom model** |
| Summary: | UnitedHealthcare Choice Plus Network is a health insurance plan offered by UnitedHealthcare. |
| Printed: | 12/18/2022 |
| Members: | Preauthorization is required for certain services, as described in your member documents. You may be penalized if you do not obtain a required |
| Web: | myuhc.com |
| Phone: | 800-444-6222 |
| Providers: | 800-666-1353 or uhcprovider.com |
| Medical Claims: | PO Box 31336, Salt Lake City, UT 84131 |
| Shared Savings: | MultiPlan. |
| Pharmacists: | 888-290-5416 |
| Pharmacy Claims: | OptumRx PO Box 650540, Dallas, TX 75265-0540 |
| Organization: | Shared Savings |
| Organization (2): | MultiPlan |
| Organization (3): | UnitedHealthcare |

*FIG. 5*

```
CaliforniaUSA
DRIVER LICENSE
DL 11234568
CLASS C
EXP 08/31/2014
END NONE
LN CARDHOLDER
FNIMA
2570 24TH STREET
ANYTOWN, CA 95818
DOB 08/31/1977
RSTR NONE
08311977
DONOR
VETERAN
IMa Condholder
```

| Model: | California driver license<br>Incorrect? Try semantic processing |
|---|---|
| Document type: | Driver license |
| Country name: | United States of America |
| Country code: | USA |
| State name: | California |
| State code: | CA |
| Driver license type: | Standard |
| Class: | C |
| Given name: | IMA |
| Family name: | CARDHOLDER |
| Address: | 2570 24TH STREET<br>ANYTOWN, CA 95818 |
| License number: | I1234568 |
| Sex: | Female |
| Age: | 45 |
| Date of birth: | 1977-08-31 |
| Issue date: | 2009-08-31 |
| Expiration date: | 2014-08-31 |

FIG. 8

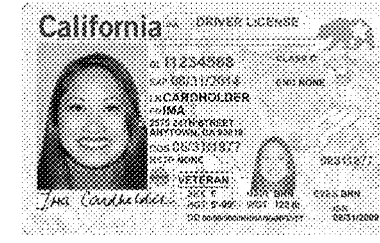

FIG. 9

MULTI-MODAL DOCUMENT TYPE CLASSIFICATION SYSTEMS AND METHODS

FIELD OF THE INVENTION

The field of the invention is AI systems with image and text processing capabilities.

BACKGROUND

The background description includes information that may be useful in understanding the present invention. It is not an admission that any of the information provided in this application is prior art or relevant to the presently claimed invention, or that any publication specifically or implicitly referenced is prior art.

As ecommerce continues to grow, websites have greater need to verify things like identity, date of birth, and so on. To do this, users are generally prompted to upload a photo of a government issued ID or some other document that can be used to authenticate a user's assertion about their age, name, the contents of a document, etc. Typically, verifying or aggregating information from uploaded photographs of documents present is done manually, at least in part because an automatic document reading system is difficult to create and can be prone to errors. But manual verification or document reading can be time consuming, leading to services that have long turnaround times to verify or gather information from a variety of scanned or photographed documents. This can be detrimental to providing certain services where customers may be lost by involving an ID verification system that takes overly long, or in situations where customers are uploading images of many documents at once, which can make manual document reading or verification overly time consuming.

This process can be sped up in a variety of ways. For example, businesses can hire what amount to mechanical Turks—individual workers that perform menial tasks. Although it is already the case that many businesses that need to verify information contained in uploaded documents use human labor, this is hardly an ideal solution at least because of costs associated with human labor. Reliability can also be a problem—human workers can get tired, make mistakes, slack off, and so on. But document reading, verification, and validation is a difficult task to assign to a computer system. It requires skills that are simple for a human but difficult for computers. Some or any combination of visually identifiable features, text, barcodes, and so on must all be considered. It is not until recently that artificial intelligence systems have been improved to a degree that they are up to these tasks.

Thus, there remains a need in the art for artificial intelligence systems that can receive images containing documents and can return verified information from those documents for use by websites and individuals.

SUMMARY OF THE INVENTION

The present invention provides apparatuses, systems, and methods directed to AI systems that are able to classify and verify documents that are present in files that are uploaded to the system.

In one aspect of the inventive subject matter, a method of using an artificial intelligence (AI) system to classify documents comprises the steps of: receiving, at a platform server running the AI system, a file comprising a document; conducting optical character recognition (OCR) on the document to extract text content of the document; identifying a document candidate based on the text content, where the document candidate has an expected document shape; detecting a shape of the document in the file; and classifying the document at least in part by determining whether the shape of the document matches the expected document shape; upon determining that the shape of the document matches the expected shape, verifying that the document candidate is correctly classified.

In some embodiments, the step of identifying the document candidate based on the text content relies on the AI system having been trained via machine learning using a training set of known document types. In some embodiments, the method also includes the step of detecting a visual feature of the document, where the step of identifying the document candidate is also based on the visual feature. Embodiments can also include the step of detecting, by the AI system, a first filetype and, based on the first filetype, determining whether to convert the file to a second filetype.

In another aspect of the inventive subject matter, a method of using an artificial intelligence (AI) system to classify documents comprises the steps of: receiving, at a platform server running the AI system, a file comprising a document; visually identifying that a barcode is present on the document; decoding the barcode to extract barcode data; and using the barcode data, detecting a document type and verifying the document.

In some embodiments, the barcode is a matrix type barcode, and the barcode data can hold text information corresponding to the document type. Embodiments of the AI system can also include the step of determining document validity using the barcode data. In some embodiments, the step of detecting the document type relies on the AI system being trained to detect the document type using a training set of documents having known document types.

The step of visually identifying that a barcode is present on the document can rely on the AI system being trained to identify barcodes using a training set of document having known barcodes. In some embodiments, the method also includes the step of making available, by the AI system to a user device, at least a portion of the barcode data and the document type. Embodiments can also include the step of converting the file from a first filetype to a second filetype.

In another aspect of the inventive subject matter, a method of using an artificial intelligence (AI) system to classify documents comprises the steps of: receiving, at a platform server running the AI system, a file comprising a document; detecting whether a barcode is present in the document; upon detecting a barcode on the document, decoding the barcode to extract barcode data; conducting optical character recognition (OCR) on the document to extract text content; detecting a visual feature present on the document; detecting a document shape; detecting a shape of the document; identifying a document candidate based on at least one of (a) the text content and (b) the visual feature, where the document candidate has an expected document shape; determining that the shape of the document matches the expected document shape; classifying the document with verification that classification is correct.

In some embodiments, the method also includes the step of training the AI system to determine whether the shape of the document matches the expected document shape by using a training set comprising documents having known document shapes. Methods can also include the step of detecting, by the AI system, a first filetype and, based on the first filetype, determining whether to convert the file to a second filetype. In some comprising the step of making available, by the AI system to a user device, at least a portion of the barcode data after the document has been classified and verified.

In some embodiments, the method also includes the step of making available, by the AI system to a user device, at least a portion of the barcode data, at least a portion of the text content, and the document type. The step of detecting the visual feature can rely on the AI system being trained to detect visual features using a training set of document having known visual features.

One should appreciate that the disclosed subject matter provides many advantageous technical effects including the ability to quickly and accurately classify documents that are present in, e.g., image files. Various objects, features, aspects, and advantages of the inventive subject matter will become more apparent from the following detailed description of preferred embodiments, along with the accompanying drawing figures in which like numerals represent like components.

BRIEF DESCRIPTION OF THE DRAWING

FIG. 2 shows an image of the front and back of a driver's license that can be uploaded to an AI system.

FIG. 3 shows a sample output generated when an AI system reads the barcode on the back of a driver's license.

FIG. 5 helps to visualize how the AI system, after failing to validate a document using barcode data, can nevertheless verify the document.

FIG. 8 shows an example of an image containing text information that matches a known document but that does not conform to an expected document shape.

FIG. 9 shows an example output from an AI system that has received an image containing the front of a driver's license.

DETAILED DESCRIPTION

Figure 1:
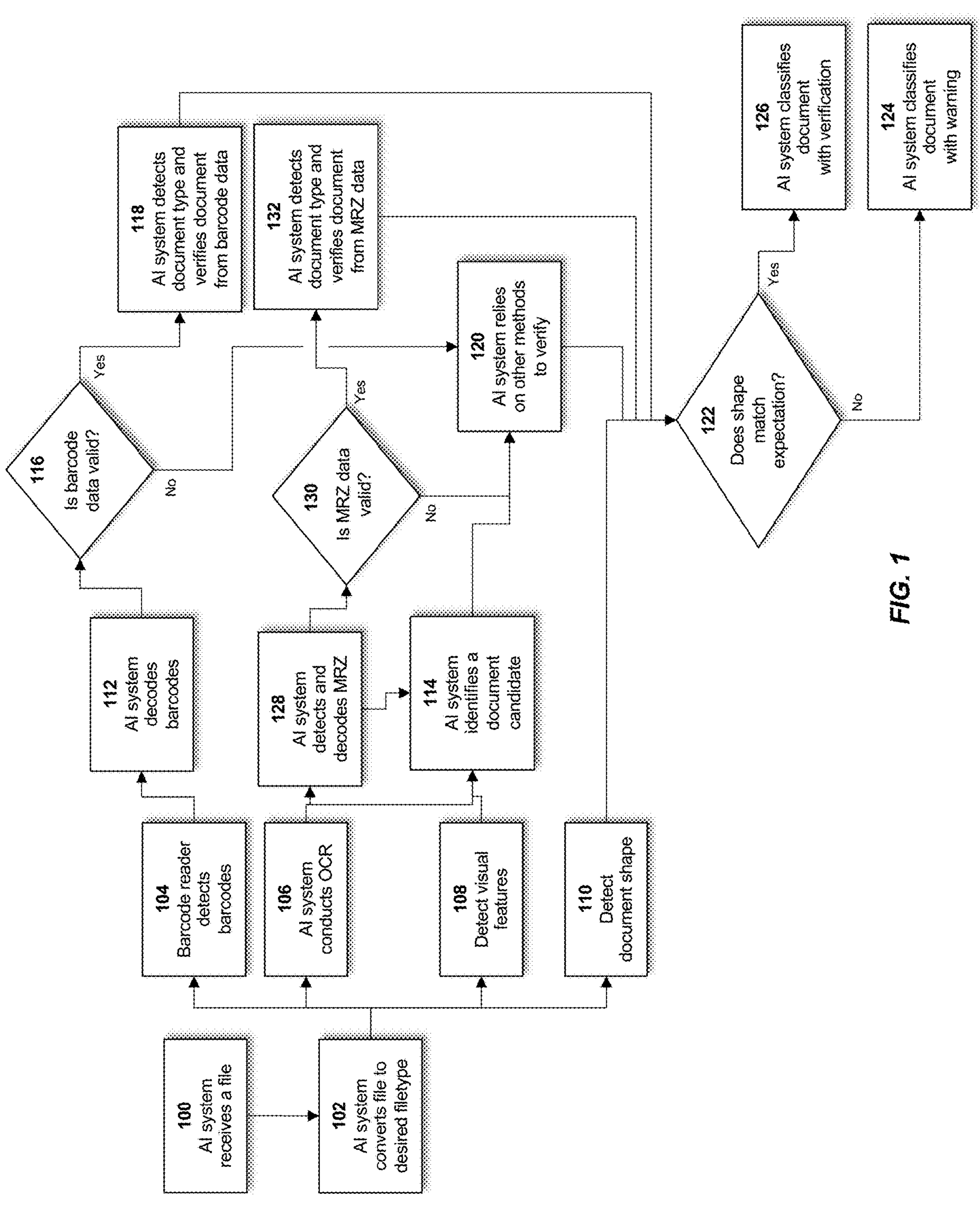
FIG. 1 is a flow chart describing AI systems of the inventive subject matter.

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be noted that any language directed to a computer should be read to include any suitable combination of computing devices, including servers, interfaces, systems, databases, agents, peers, Engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. The following description includes information that may be useful in understanding the present invention. It is not an admission that any of the information provided in this application is prior art or relevant to the presently claimed invention, or that any publication specifically or implicitly referenced is prior art.

Systems of the inventive subject matter are directed to artificial intelligence (AI) systems that are capable of identifying and processing documents present in photographs. There are many reasons why an AI system that can identify documents in photos is needed. First, it can help to automate the process of document management. For example, if a system can identify documents in photos, it can automatically extract the text from the documents and store it in a database. This can save a lot of time and effort for businesses that need to manage large amounts of documents. Second, a system that can identify documents in photos can help to improve security. For example, if a system can identify passports in photos, it can be used to verify the identity of people who are trying to access secure areas. This can help to prevent fraud and identity theft. Third, a system that can identify documents in photos can help to improve customer service. For example, if a system can identify receipts in photos, it can be used to automatically process customer refunds. This can save customers time and hassle, and it can also improve the reputation of businesses that provide good customer service.

AI systems described in this application are designed to receive images of any number of documents, determine what the document is, and then gather information from those documents. In some embodiments, AI systems can additionally provide verification of document type based on one or any combination of document aspects like visual features, barcodes, text content, and so on.

FIG. 1 is a flow chart describing how an AI system of the inventive subject matter can function. AI systems described in this application use artificial intelligence to make determinations about fitness and content of documents contained in uploaded files and can pull information from those documents. Uploaded files can feature a variety of documents, standardized and otherwise, like a driver's licenses, identification cards, forms, receipts, invoices, certificates, and so on. In this application, references to the AI system should be understood as referring to software running on a platform server, which can be configured as one or more servers (e.g., a cloud platform). Thus, when reference is made to a platform server, it should likewise be understood as being part of, or cooperating with, the AI system operating thereon. The AI system can be, e.g., part of a backend of a website or software application. In some embodiments, the AI system can be accessed by API call and can be made accessible from any website or software application.

In step 100, the AI system receives a file containing a document. Files uploaded to the AI system can include images in any image format including PNG, JPG, GIF, TIFF, WEBP, RAW, EPS, and so on, including proprietary image formats like Apple's HEIC. In addition to image files, the AI system can also receive documents uploaded in a variety of document-based formats. For example, the AI system can receive file types including: Microsoft Office formats including DOC, DOCX, XLS, XLSX, PPT, PPTX; Open Office formats including ODS, ODT, ODP; PDF—both digital and image-only files are supported, files can be single or multi-page, and files can contain multiple document types (e.g., 3 ID pages plus 1 invoice); ZIP directories containing any supported file format; email message files (e.g., MSG) including any files or documents contained in or attached to up uploaded email or emails. It should be understood that the list of file types above is not exhaustive and should instead be considered demonstrative of variety of types of files an AI system of the inventive subject matter can receive.

For example, a user can take a picture of their driver's license and then upload that picture to a platform server running the AI system. FIG. 2, for example, shows an example of a filed uploaded that contains images of the front and back of a driver's license. Both the front and the back of the driver's license are shown, and each side of the driver's license includes different features that can be detected by systems and methods of the inventive subject matter. In step 102, the AI system converts the image to a desired filetype (e.g., a more useful format for image processing). An example of a useful format is the Portable Network Graphics format (*.PNG). PNG is a raster-graphics file format that supports lossless data compression. PNG was developed as an improved, non-patented replacement for Graphics Interchange Format. If the document received is already in a desired format, then step 102 involves checking whether converting to a different format is necessary and, if not, then no action is taken.

There are a few benefits to using PNG files for AI and machine vision. PNG files are a lossless image format, which means that they do not lose any quality when they are compressed or decompressed. This makes them a good choice for storing images for use with AI and machine vision, which work best with images that are accurate and precise. A lossless format ensures an AI or machine vision system is able to detect issues with the content of an image instead of issues that can arise due to compression.

PNG is not the only format that AI systems of the inventive subject matter can convert files into. For example, in some embodiments, the AI system can convert an uploaded file from its original format to another suitable image format that is selected based on a variety of factors including expected file degradation resulting from compression balanced against the benefits of storing a compressed image file. Suitable image files can include any of the image files mentioned above.

After step 102, steps 104, 106, 108, and 110 can take place. One or any combination of these steps can occur after step 102, depending on, e.g., the type of document—or the features of a document—present in an uploaded image. For example, in an image where a document does not feature a barcode, step 104 will not take place at all, while steps 106, 108, and 110 could all take place. These steps can occur in parallel instead of in serial. Even if, for example, it turns out barcode information is sufficient to detect and verify a document, each of the other steps are nevertheless carried out in case it turns out they are needed. This may decrease computational efficiency but can improve performance by having additional information available in case one branch of the flowchart fails to yield a useful result.

In instances where step 104 takes place, the AI system analyzes an uploaded image to find one or more barcodes. Finding a barcode in, e.g., an image file can be accomplished via machine vision and can be the result of training the AI system to identify barcodes by using training sets of images having barcodes. AI systems of the inventive subject matter can be configured identify any type of barcode. Some types of barcodes include linear type (e.g., UPC) and matrix type (e.g., QR). If the AI system detects a barcode code, the AI system can then decode the barcode according to step 112.

Barcode decoding can be accomplished by, e.g., software barcode decoders or, in some embodiments, via AI barcode decoders that have been trained to decode barcodes of various types. Thus, after identifying the barcode in the image according to step 104, the AI system can then decode the barcode. In some embodiments, image processing can be used to remove noise from the image and to make the barcode's data more easily visible. Decoding the barcode's data involves converting the data into a machine-readable format. In the case of barcodes, the data is typically converted into a number or a string of characters. Once a barcode has been decoded, the text information contained in the barcode sometimes can be further decoded, depending on the format it exists in after being extracted from a barcode. In some embodiments, barcode data can be further reformatted after it has been decoded to make its content accessible or easier to read/use.

Figure 4:
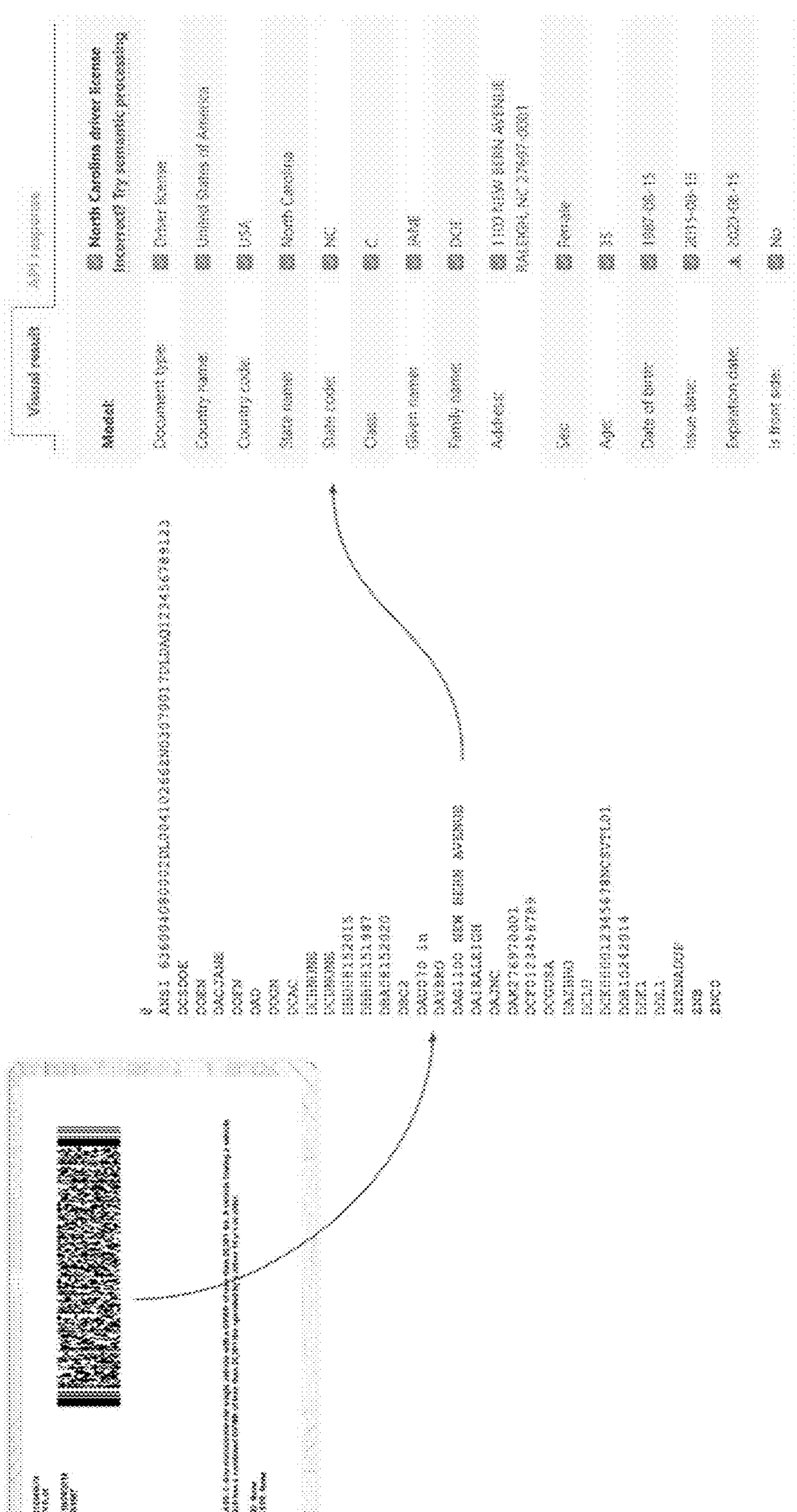
FIG. 4 visually shows the result of an AI system reading a barcode.

Once step 112 is completed, and a barcode has been decoded, the AI system checks to see if the document in the image is valid according to step 116. FIG. 3 shows an example output that can result from the AI system receiving an image of the back of a driver's license, and FIG. 4 shows an example of how an AI system of the inventive subject matter validates a document after decoding its barcode. As described above, upon detecting a barcode, the AI system decodes that barcode to translate the barcode data into text. An example of that text is shown in the figure, starting with an ANSI code. The AI system then ensures that the decoded barcode data is in a valid format per step 116. For example, identification cards and driver's licenses in the United States store data in barcode format PDF417. Barcode data is output as text in a specific format, and the AI system then understands that text format and uses the text to, e.g., generate an API result. Barcodes in PDF417 format can contain enough information for the AI system, in many cases, to detect and verify document type from information in the barcode alone, per steps 104, 112, 116, and 118, without carrying out any of the other steps described in this application. In some embodiments, though, these steps are carried out in association with the other steps, and document detection and verification can be carried out using any or all results of the different steps described in relation to the flow chart in FIG. 1. Similarly, QR codes can be decoded by AI systems of the inventive subject matter. For example, QR codes are often used in SMART Health Cards, which can be used to verify health-related information such as vaccination status.

Thus, from an image of the back of a driver's license as shown in FIG. 4, an AI system of the inventive subject matter can discern a variety of information. In addition to reading the barcode, the AI system can also extract information about the license based on features of the license, the shape of the license, and written content on the license. The AI system can then output all available information from the document in the image for easy use or access (e.g., as a table, via API, and so on). Available information from the back of a driver's license can include document type; country name; country code; state name; state code; class; given name; family name; address; sex; age; date of birth; issue date; expiration date; an indication as to whether the front of the license is visible; and a card revision date.

If the AI system determines that a document is valid in step 116, then in step 118 the AI system uses the barcode to detect and verify the document type. For example, if a driver's license barcode is scanned and found to be valid, then the AI system can verify in step 118 that the driver's license in the image is truly a driver's license. Thus, the driver's license in the image is verified to be authentic, and information from the driver's license can be made available via, e.g., API, visual display, or the like.

FIG. 5 shows how the AI system, after failing to validate a document in step 116 using, e.g., barcode data, can nevertheless verify a document per step 120. In step 120, as an example, the AI system must rely on a different method to verify a document because steps preceding this have failed in some regard the prevents successful verified document classification. For example, in FIG. 5, the back of a health insurance card features a PDF417 barcode, which, as explained above, is commonly included on driver's licenses and identification cards in the United States, but the presence of a PDF417 barcode does not necessarily mean the document in the image is a driver's license or ID card.

In general, the presence of a PDF417 barcode might indicate the document is a driver's license or ID card, but in the case of the document in FIG. 5, none of the other features or content of the card indicate it is a driver's license. In fact, upon reading the barcode, the resulting text content in a format that is inconsistent with a driver's license or ID card. If upon reading the barcode the format is not recognized, or if for some reason the barcode cannot be read at all (e.g., because of a smudge or other visual defect), then the document can be considered as having no barcode at all, and the AI system can rely on, e.g., a key-value reader to identify other information on the document. A key-value reader is a program that reads a key-value file and parses it into a data structure that can be easily accessed by the program. A key-value file is a file that stores data in the form of key-value pairs. Each key-value pair consists of a key and a value. The key is a unique identifier for the value, and the value is the data associated with the key. In practice, all aspects of a document, visual and written, can be processed concurrently, and then the AI system can make determinations about which information to use to identify the document based on the information that is ultimately available.

As shown next to the image of the back of the health insurance card in FIG. 5, information from the card is nevertheless presented by the AI system. In this case, though, because the type of document is not ultimately known, the "model" category is filled with "form (semantic)" because the AI system used semantic processing to process the document as if it were a form. Semantic processing includes, e.g., a key-value reader described above, which can be used in association with OCR, and forms can additionally be identified according to shape and visual features. After verifying a document by some alternative method (e.g., other than by using MRZ data or barcode data), the AI system in step 122 check to see if the shape of the document matches the expected shape of the document, which is described below in more detail.

After step 102, the AI system can also perform optical character recognition (OCR) to extract text information according to step 106. Based on text information extracted via OCR, the AI system, according to step 114, identifies one or more suitable document candidates. The step is carried out via artificial intelligence. For example, using artificial intelligence and based on text extracted via OCR, the AI system can determine that the document in an image is most likely to be a driver's license or an insurance document. Natural language processing can be implemented to allow the AI system to detect information on a document such as an organization name, a person name, a date, a document title, or any other written information. Artificial intelligence can come into play by training the AI system on sets of already-identified and verified documents such that the AI system can match a newly uploaded document to a document type that it has already been trained on. Any time an AI system of the inventive subject matter is described as carrying out a process involving identifying, detecting, verifying, validating, and so on, as described in this application, should be understood to be accomplished by training the AI system to carry out those functions via training sets comprising known documents having known text, known visual features, known shapes, and so on.

After conducting OCR in step 106, the AI system in step 128 can detect and decode one or more machine-readable zones (MRZ). An MRZ is a specific area on a travel document that contains the document holder's personal data in a format that can be read by machines. On a password, the MRZ is usually located at the bottom of the passport's data page. The MRZ on a passport contains the following information: passport number; surname; given names; nationality; date of birth; sex; date of issue; date of expiry; place of birth; and the passport issuing authority. The MRZ is encoded in a specific format that can be recognized by an AI system of the inventive subject matter. Different documents can feature MRZs, and the specific format in which data is organized in an MRZ can indicate a document type. In some embodiments, the AI system carry out step 114 in association with decoded MRZ data.

Thus, after reading MRZ data, the AI system can determine whether the MRZ data is valid in step 130. To determine validity, the AI system checks whether the MRZ data matches an expected format that corresponds to a type of document. For example, passport data in an MRZ will always conform to a formatting specific to passports. Thus, if the AI system reads an MRZ and identifies (e.g., based on having been trained to do so) that the content of the MRZ matches the formatting of a passport, then the AI system can determine that the data is valid. Upon determining that the data in an MRZ is valid, then in step 132, the AI system can classify the document as a particular document type, and it can verify the document using the MRZ data.

If, on the other hand, the AI system detects MRZ data that is not valid for any reason (e.g., it is not in the right format), then the AI system move to step 120, in which the AI system must rely on other methods to verify the document. Whether step 130 leads to step 120 or step 132, the AI system nevertheless checks to see whether the document's shape matches an expected document shape according to step 122, described in more detail below.

Figures 6, 7:
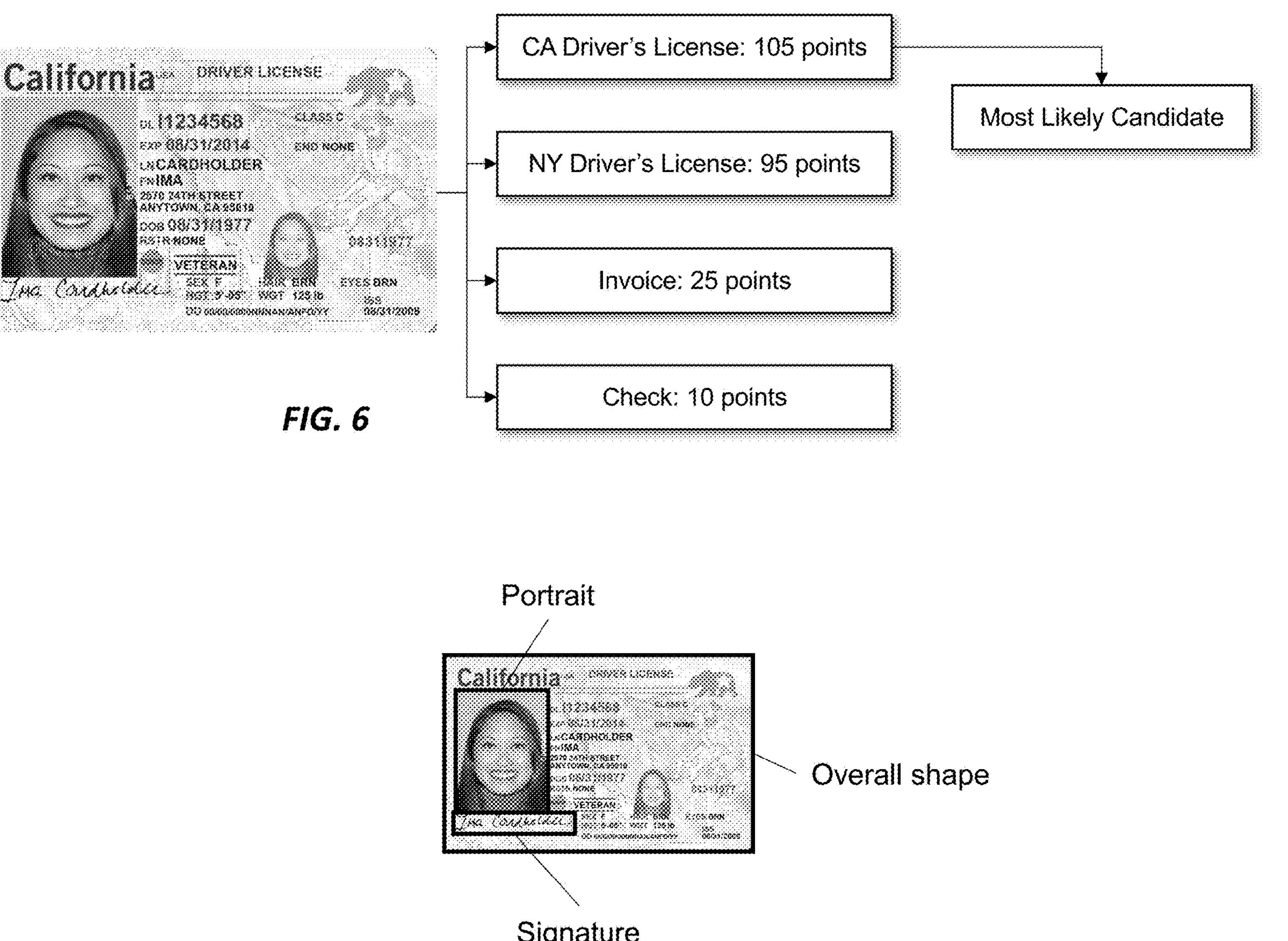
FIG. 6 shows an example of how an AI system can identify a most suitable candidate for a document.
FIG. 7 points out different features of a driver's license that an AI system can identify.

FIG. 6 shows an example of how an AI system of the inventive subject matter, after one or both of steps 106 and 108, can determine a most suitable candidate for a document per step 114. Based on the text content of the driver's license image that the AI system has OCR'd in step 106, and/or based on visual features detected in step 108, the AI system identifies several different document candidates. This matching can be carried out via machine learning by training the AI system using text contents of known documents, including, e.g., driver's licenses from different states, invoices, and checks. In the case of the driver's license in FIG. 6, the AI system, based on information gathered in step 106, identifies several different document candidates, and assigns each candidate a point value that corresponds with a confidence level. In the case of an image containing the front of a driver's license, the AI system has assigned 105 points for a California driver's license, 95 points for a New York driver's license, 25 points for an invoice, and 10 points for a check. Both driver's licenses have high scores because of their largely overlapping text content, but because the driver's license in the image is California license, the AI system scores it higher than a New York license at least because the word "California" would match with expectation whereas the words "New York" would not. Thus, the AI system identifies that the document in the image is most likely to be a California driver's license.

The AI system can also perform step 108 after step 102. In step 108, as described above, the AI system analyzes the image to detect one or more visual features of the document in the image. Features that the AI system can detect depend on features of documents in a training set used to teach the AI system how to identify visual features of documents. A feature can be, e.g., a visually identifiable aspect of a document in an image, such as a marking on a driver's license indicating that the driver's license is real ID compliant. As shown in FIG. 1, visual features that are detected can be used by the AI system in step 114 to help identify a document candidate. For example, if the AI system detects a portrait and a signature, those features can help the AI system identify that one possible document candidate is a driver's license. In some embodiments, after a document candidate is identified, the AI system in step 122 can determine whether the document's overall shape matches, and, if needed, further consider whether any identified visual features further confirm that the document matches the expected document.

For example, in FIG. 7, a driver's license is shown with annotations indicating different features that can be detected, including a portrait, a signature, and an overall shape. In the case of, e.g., a California driver's license, the AI system can identify the signature and the portrait as features of the document indicating the document is a driver's license. Position and location of features on a document can also be considered when determining what a feature is and also in determining what a document is (e.g., by helping to identify a document candidate or by helping to verify that a document candidate is correct by then checking for visual features that are expected based on an identified document candidate). The AI system can also detect other features including for example tables, forms, watermarks (e.g., a diagonally written "DRAFT" or "CONFIDENTIAL" label), Real ID and Enhanced ID signs or symbols, and radio buttons and checkmark boxes.

Finally, the AI system, according to step 110, can also detect a document shape after completing step 102. There are a few different ways that an AI system could identify a document shape in an image and then match that document shape to known document type. One way of detecting a document shape in an image is a technique called edge detection. Edge detection is a process of identifying the edges in an image. Edges are the places where, e.g., the brightness of an image changes sharply. Once the edges have been identified per step 110, the edges will have formed the overall shape of a document in an image, and with an overall document shape known, the AI system can then match an overall document shape to one or more known document shapes per step 122, where the known document shapes have been trained into the AI system via machine learning.

Another way that an AI system could match a document shape in an image to a known document shape would be to use a technique called template matching. After determining the overall shape of a document via, e.g., edge detection, the AI system can match a template, which is a small image that contains the shape of a document, to the overall shape of the document in the image. Thus, when the AI system compares a document in an image to a template, the areas of the image that match the template can be identified. By maintaining a database of documents that match certain templates, the AI system can match a document shape to a template to come up with a one or more documents that a document in an image could be based on its overall shape according to step 122. Machine learning can be implemented in this process to train the AI system to accurately match document shapes present images to templates in a database via training sets of images containing already-identified documents that are matched to the different document shape templates. Once trained, the AI system can match an identified overall document shape to a document template, which narrows down what a document in an image can be to only those documents matching the template. Each document template can represent one or more different document types.

An AI system of the inventive subject matter could also match document shapes in an image to known documents by more directly using machine learning. For example, the AI system can be trained to recognize the shapes of documents in an image using training sets of images with known documents present in the images. Once the AI system has been trained, it can then be used to identify the shapes of documents in new images per step 110.

After completing all or some subset of preceding steps, including steps 110, 120, 118, and 132, the AI system in step 122 can check whether the document shape in the image matches an expected document shape. An expected document shape can depend on a variety of factors. In some embodiments, an expected document shape can be determined based on information gathered in one or both of steps 106, 108, and even step 128. If, for example, information gathered during one or any of those steps matches the information expected for a driver's license, then AI system will identify one or more document candidates having expected document shapes. Thus, in steps 110 and 122, the AI system can, using machine learning, detect an overall document shape according to any of the methods described above and then determine whether the detected document shape matches an expected document shape.

In situations where the AI system in step 122 determines that a detected document shape matches an expected document shape, then in step 126, the AI system classifies the document and verifies its authenticity. But if the detected document shape does not match the expected document shape, then in step 124 the AI system can classify the document with a warning, such as a warning that the shape did not match.

One way for the AI system to classify a document with a warning per step 124 would be if a user uploads an image that contains text information from a document without actually uploading a picture of the document itself. FIG. 8 shows an image containing information that can be found on a California driver's license, but the image is not one of a California driver's license. The AI system, in the course of step 106, extracts text-based information from the image. But because the image received by the AI system does not actually include the driver's license itself, steps 104, 108, and 110 will fail to discern any useful information (e.g., the AI system will not see a barcode, it will not find any features of a driver's license, nor will it detect a document shape). The text content in the image discerned in step 106, on the other hand, will indicate, per step 114, that a California driver's license is a most likely candidate. But despite the text content of a driver's license existing in the image, step 122 asks whether the document's shape matches an expected shape. And because no driver's license exists in the image, the AI system will determine the answer to be "no," and the AI system will classify the document as a California driver's license while issuing a warning next to that classification. An example output is also shown in FIG. 8, and in the first row a warning exists next to the "model" determination. Warnings can be issued for any information that the AI system identifies in an uploaded document, and whether to issue a warning can be based on, e.g., a confidence level the AI system assigns to a resulting piece of information.

An AI system of the inventive subject matter can classify a document with a warning in other situations, too. For example, if an image file is uploaded that contains a picture of a receipt that is printed onto an 8.5"×11" piece of paper, then everything about the document in that file would be interpreted by the AI system to be a receipt—it would include prices, a subtotal, local taxes, different items, and so on—except the AI system would not detect the correct overall shape for a receipt, instead seeing the overall shape of the 8.5"×11" piece of paper that the receipt is printed on.

FIG. 9 shows an example output that can result from the AI system receiving an image of the front of a driver's license where the final result is the AI system classifying the document as a verified California driver's license according to step 126. The AI system analyzes the image according to steps 104, 106, 108, and 110. Because no bar code exists in the image of the front of a driver's license, step 104 can be skipped, and instead the AI system can focus on steps 106, 108, and 110. Thus, the AI system OCRs the document in the image (step 106), detects features that exist on the document in the image (108), and detects the shape of the document in the image (step 110).

From step 106, the AI system analyzes text content from the document to identify, per step 114, one or more suitable candidates for document type. Per step 108, the AI system detects features of the document, such as the signature and the portrait, and per step 110, the AI system detects the overall document shape (as discussed above in FIG. 7). After gathering information per steps 106, 108, and 110, the AI system determines if the overall shape of the document matches an expected overall document shape. In the case of FIG. 4, the AI system uses information from step 106 to determine one or more most likely candidates and then checks if any of those document candidates matches an expected document shape. If the answer is yes, then the AI system classifies the document in the image as a verified California driver's license and outputs information.

Information gathered from the driver's license in FIG. 9 is shown below the image, and it includes: model (e.g., California driver's license); document type (e.g., driver's license); country name (e.g., United States of America); country code (e.g., USA); state name (e.g., California); state code (e.g., CA); driver's license type (e.g., standard); class (e.g., C); given name (e.g., a first name); family name (e.g., a last name); address (e.g., a street address); license number (e.g., a driver's license number); sex (e.g., male, female, etc.); age; date of birth; issue date; expiration date; and an indication of whether the front of the license is visible in the image (e.g., yes/no).

Embodiments of the inventive subject matter can be used on their own or in association with one or more human workers that can provide an additional layer of verification.

Thus, specific systems and methods directed to the use of artificial intelligence and machine learning in the space of document identification and verification. It should be apparent to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A method of using an artificial intelligence (AI) system to classify documents, the method comprising the steps of:
- receiving, at a platform server running the AI system, a file comprising a document;
- conducting optical character recognition (OCR) on the document to extract text content of the document;
- identifying a document candidate based on the text content, wherein the document candidate has an expected document shape;
- detecting a shape of the document in the file;
- classifying the document at least in part by determining whether the shape of the document matches the expected document shape; and
- upon determining that the shape of the document matches the expected shape, verifying that the document candidate is correctly classified.

2. The method of claim 1, wherein the step of identifying the document candidate based on the text content relies on the AI system having been trained via machine learning using a training set of known document types.

3. The method of claim 1, further comprising the step of detecting a visual feature of the document, wherein the step of identifying the document candidate is also based on the visual feature.

4. The method of claim 1, further comprising the step of detecting, by the AI system, a first filetype and, based on the first filetype, determining whether to convert the file to a second filetype.

5. The method of claim 1, further comprising the step of detecting and decoding a machine-readable zone.

6. A method of using an artificial intelligence (AI) system to classify documents, the method comprising the steps of:
- receiving, at a platform server running the AI system, a file comprising a document;
- visually identifying that a barcode is present on the document;
- decoding the barcode to extract barcode data; and using the barcode data, detecting a document type, wherein detecting the document type comprises determining whether the barcode data is in a valid format corresponding to an expected format for the document type; and verifying the document based at least in part on determining that the barcode data is in the valid format.

7. The method of claim 6, wherein the barcode comprises a matrix type barcode.

8. The method of claim 6, wherein the barcode data comprises text information corresponding to the document type.

9. The method of claim 6, further comprising the step of determining document validity using the barcode data.

10. The method of claim 6, wherein the step of detecting the document type relies on the AI system being trained to detect the document type using a training set of documents having known document types.

11. The method of claim 6, wherein the step of visually identifying that a barcode is present on the document relies on the AI system being trained to identify barcodes using a training set of document having known barcodes.

12. The method of claim 6, further comprising the step of making available, by the AI system to a user device, at least a portion of the barcode data and the document type.

13. The method of claim 6, further comprising the step of converting the file from a first filetype to a second filetype.

14. A method of using an artificial intelligence (AI) system to classify documents, the method comprising the steps of:

receiving, at a platform server running the AI system, a file comprising a document;

detecting whether a barcode is present in the document;

upon detecting a barcode on the document, decoding the barcode to extract barcode data;

conducting optical character recognition (OCR) on the document to extract text content;

detecting a visual feature present on the document;

detecting a document shape;

detecting a shape of the document;

identifying a document candidate based on at least one of (a) the text content and (b) the visual feature, wherein the document candidate has an expected document shape;

determining that the shape of the document matches the expected document shape; and classifying the document with verification that classification is correct.

15. The method of claim 14, further comprising the step of training the AI system to determine whether the shape of the document matches the expected document shape by using a training set comprising documents having known document shapes.

16. The method of claim 14, further comprising the step of detecting, by the AI system, a first filetype and, based on the first filetype, determining whether to convert the file to a second filetype.

17. The method of claim 14, further comprising the step of making available, by the AI system to a user device, at least a portion of the barcode data after the document has been classified and verified.

18. The method of claim 14, further comprising the step of making available, by the AI system to a user device, at least a portion of the barcode data, at least a portion of the text content, and the document type.

19. The method of claim 14, wherein the step of detecting the visual feature relies on the AI system being trained to detect visual features using a training set of document having known visual features.

20. The method of claim 14, further comprising the step of detecting and decoding a machine-readable zone.

* * * * *